US012585562B1

(12) United States Patent
Macdonald

(10) Patent No.: US 12,585,562 B1
(45) Date of Patent: Mar. 24, 2026

(54) SYSTEMS, METHODS, AND DEVICES FOR A VENDOR-AGNOSTIC FRAMEWORK FOR AUTOMATED VALIDATION OF APPLICATIONS

(71) Applicant: The PNC Financial Services Group, Inc., Pittsburgh, PA (US)

(72) Inventor: John Zacharia Macdonald, Pittsburgh, PA (US)

(73) Assignee: THE PNC FINANCIAL SERVICES GROUP, INC., Pittsburgh, PA (US)

( * ) Notice: Subject to any disclaimer, the term of this patent is extended or adjusted under 35 U.S.C. 154(b) by 22 days.

(21) Appl. No.: 18/166,631

(22) Filed: Feb. 9, 2023

Related U.S. Application Data

(63) Continuation of application No. 18/146,220, filed on Dec. 23, 2022.

(60) Provisional application No. 63/266,265, filed on Dec. 30, 2021.

(51) Int. Cl.
| | |
|---|---|
| *G06F 11/30* | (2006.01) |
| *G06F 8/61* | (2018.01) |
| *G06F 8/65* | (2018.01) |
| *G06F 8/76* | (2018.01) |
| *G06F 11/3604* | (2025.01) |

(52) U.S. Cl.
CPC .............. *G06F 11/302* (2013.01); *G06F 8/61* (2013.01); *G06F 8/65* (2013.01); *G06F 8/76* (2013.01); *G06F 11/3604* (2013.01)

(58) Field of Classification Search
CPC ....... G06F 8/60–66; G06F 11/36–3696; G06F 11/34–3495; G06F 9/44526; G06F 11/3698
See application file for complete search history.

(56) References Cited

U.S. PATENT DOCUMENTS

| | | | |
|---|---|---|---|
| 5,946,680 A | 8/1999 | Shorter et al. | |
| 6,868,540 B2 * | 3/2005 | Hunsinger .............. | G06F 9/542 |
| | | | 718/100 |
| 7,093,232 B1 | 8/2006 | Chatzigianis et al. | |
| 7,583,187 B1 | 9/2009 | Cheng et al. | |

(Continued)

*Primary Examiner* — Todd Aguilera
(74) *Attorney, Agent, or Firm* — FINNEGAN, HENDERSON, FARABOW, GARRETT & DUNNER LLP

(57) ABSTRACT

Systems, methods, and devices for integrating a software component into a software framework and for orchestrating and integrating data are disclosed. In one implementation, the disclosed system may receive a software component with a sequence of instructions. Consistent with disclosed embodiments, the system may determine whether the sequence of instructions is native to a predetermined operating system. Further, the system may add the sequence of instructions to a framework configuration interpreter engine when the sequence of instructions is native. Alternatively, the system may use a framework wrapper engine to adapt the sequence of instructions to be added to the framework configuration interpreter engine when the sequence of instructions is not native, and then add the adapted sequence of instructions to the framework configuration interpreter engine. The system may be configured to integrate, using the framework configuration interpreter engine, the sequence of instructions as a software component into the software framework.

20 Claims, 7 Drawing Sheets

(56)                  References Cited

U.S. PATENT DOCUMENTS

| | | | | |
|---|---|---|---|---|
| 7,640,337 B1 * | 12/2009 | Fultz | ................... | G06F 11/3612 |
| | | | | 709/224 |
| 7,716,017 B2 * | 5/2010 | Pfohe | ................. | G06F 11/3476 |
| | | | | 709/225 |
| 8,266,700 B2 | 9/2012 | Sima et al. | | |
| 8,578,000 B2 | 11/2013 | Van Wie et al. | | |
| 8,751,778 B2 | 6/2014 | Tukol et al. | | |
| 8,898,627 B2 | 11/2014 | Gass et al. | | |
| 8,972,942 B2 | 3/2015 | Gu et al. | | |
| 9,244,809 B1 | 1/2016 | Vilakkumadathil | | |
| 9,442,745 B2 | 9/2016 | Xia et al. | | |
| 9,983,869 B2 | 5/2018 | Webb | | |
| 10,838,744 B2 | 11/2020 | Berlitz et al. | | |
| 11,010,279 B2 | 5/2021 | Morris et al. | | |
| 11,263,111 B2 | 3/2022 | Lang et al. | | |
| 11,467,553 B2 * | 10/2022 | Short | ................... | B60K 35/28 |
| 2002/0165893 A1 * | 11/2002 | Hunsinger | ............. | G06F 9/542 |
| | | | | 718/100 |
| 2004/0034510 A1 * | 2/2004 | Pfohe | ................. | G06F 11/3476 |
| | | | | 702/187 |
| 2006/0129992 A1 * | 6/2006 | Oberholtzer | ........ | G06F 11/3428 |
| | | | | 717/124 |
| 2006/0259973 A1 | 11/2006 | Sima et al. | | |
| 2010/0064357 A1 | 3/2010 | Baird et al. | | |
| 2010/0146085 A1 | 6/2010 | Van Wie et al. | | |
| 2011/0283269 A1 | 11/2011 | Gass et al. | | |
| 2012/0198218 A1 | 8/2012 | Tukol et al. | | |
| 2013/0047039 A1 * | 2/2013 | Manes | ................ | G06F 11/3466 |
| | | | | 714/47.1 |
| 2013/0205277 A1 | 8/2013 | Seven et al. | | |
| 2014/0026120 A1 | 1/2014 | Gu et al. | | |
| 2015/0067638 A1 | 3/2015 | Xia et al. | | |
| 2015/0199247 A1 * | 7/2015 | Sangani | ............. | G06F 11/3672 |
| | | | | 714/46 |
| 2016/0019132 A1 | 1/2016 | Vilakkumadathil | | |
| 2016/0034276 A1 | 2/2016 | Webb | | |
| 2020/0125050 A1 * | 4/2020 | Short | .................... | B60K 35/10 |
| 2020/0174800 A1 | 6/2020 | Berlitz et al. | | |
| 2020/0257612 A1 | 8/2020 | Lang et al. | | |
| 2020/0278918 A1 | 9/2020 | Morris et al. | | |

* cited by examiner

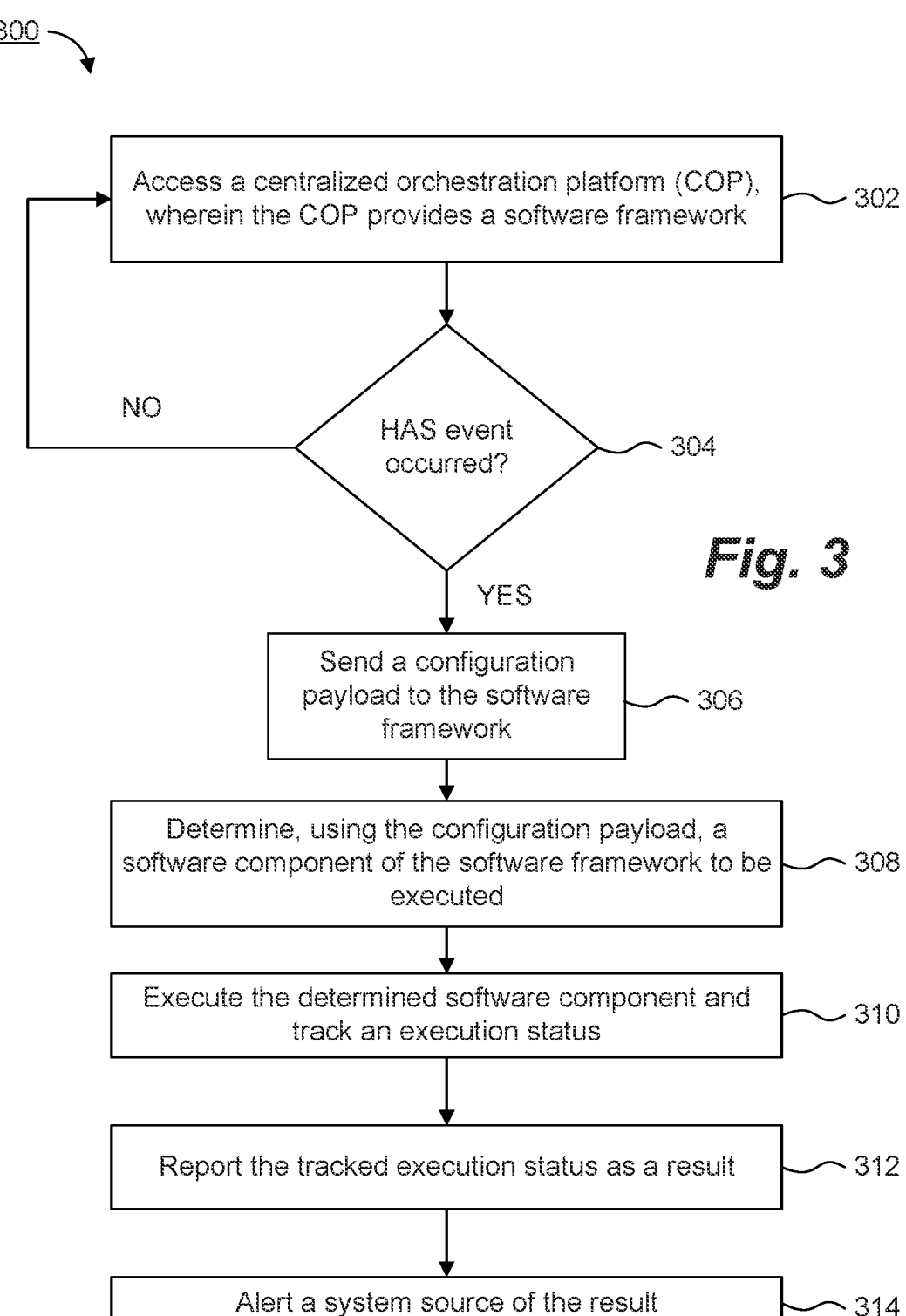

300

Access a centralized orchestration platform (COP), wherein the COP provides a software framework — 302

HAS event occurred? — 304

NO

YES

Fig. 3

Send a configuration payload to the software framework — 306

Determine, using the configuration payload, a software component of the software framework to be executed — 308

Execute the determined software component and track an execution status — 310

Report the tracked execution status as a result — 312

Alert a system source of the result — 314

400

SYSTEMS, METHODS, AND DEVICES FOR A VENDOR-AGNOSTIC FRAMEWORK FOR AUTOMATED VALIDATION OF APPLICATIONS

CROSS-REFERENCE TO RELATED APPLICATION

This application is a continuation of U.S. application Ser. No. 18/146,220, filed Dec. 23, 2022, which claims priority to U.S. Provisional Patent Application No. 63/266,265 filed on Dec. 30, 2021, the entire contents of all of which are incorporated herein by reference.

FIELD OF THE DISCLOSURE

The disclosed embodiments generally relate to systems, devices, methods, and computer readable medium for a platform-agnostic framework for automated validation of applications.

BACKGROUND

Data validation includes a method or function that checks and adjusts data, usually before importing and processing, for accuracy and quality. Many different types of validations may be performed (e.g., data-type check, simple range and constraint check, consistency check, and/or other similar checks) depending on the objective and/or constraint. Validations are generally performed in computer and/or network-based systems. Validations may be performed at different points. For example, data may be validated before being input into a system at a client side and/or data may be validated after being input into a system at a server side. These different validations may need to be performed on different devices, each device having different software and technology.

Most validation frameworks available today, both open source and commercial, are tied to a specific technology and require both complex systems and third-party software. Various frameworks include a particular library and function as a monitoring tool to validate data. These monitoring tools, all solve a similar problem, validating data, in various ways (e.g., a subject matter expert performs routine tasks). The variety of ways used to solve one single problem adds complexity and uses precious resources including but not limited to money and time.

As computer and network-based systems become more complex and include many different types of technology, it is increasingly important to automatically validate data at any point in time instead of relying on specific server-client relationships. For applications used, e.g., as software by institutions including but not limited to charities, government, education, healthcare, legal, media, military, non-profit, labor, politics, research, transportation, and finance, a platform-agnostic framework which does not require additional or third-party software to validate data is critical to efficiently ensuring that data is accurate both before and after spanning different types of technology, systems, and applications.

Thus, it is desirable for a computer or network-based data validation system to be able to validate data without relying on a provider of a software or application, a specific technology, a server-side point in time, a client-side point in time, or any other constraints negatively affecting cost, time, and efficiency. Computerized validation systems, methods, and devices proposed herein leverage, for example, the native capabilities of the existing technology to extend the framework and automatically validate data without relying on provider- or technology-specific systems or methods.

BRIEF DESCRIPTION OF THE DRAWINGS

FIG. 3 illustrates an exemplary method for orchestration and integration of data, consistent with some embodiments of the present disclosure.

DESCRIPTION OF EXEMPLARY EMBODIMENTS

It is to be understood that both the foregoing general description and the following detailed description are exemplary and explanatory only and are not restrictive of this disclosure. The accompanying drawings, which are incorporated in and constitute a part of this specification, illustrate several exemplary embodiments and together with the description, serve to outline principles of the exemplary embodiments.

This disclosure may be described in the general context of customized hardware capable of executing customized pre-loaded instructions such as, e.g., computer-executable instructions for performing program modules. Generally, program modules include routines, programs, objects, components, data structures, and so forth, which perform particular tasks or implement particular abstract data types. The disclosed embodiments may also be practiced in distributed computing environments where tasks are performed by remote processing devices that are linked through a communications network. In a distributed computing environment, program modules may be located in local and/or remote computer storage media including memory storage devices.

Figure 4:
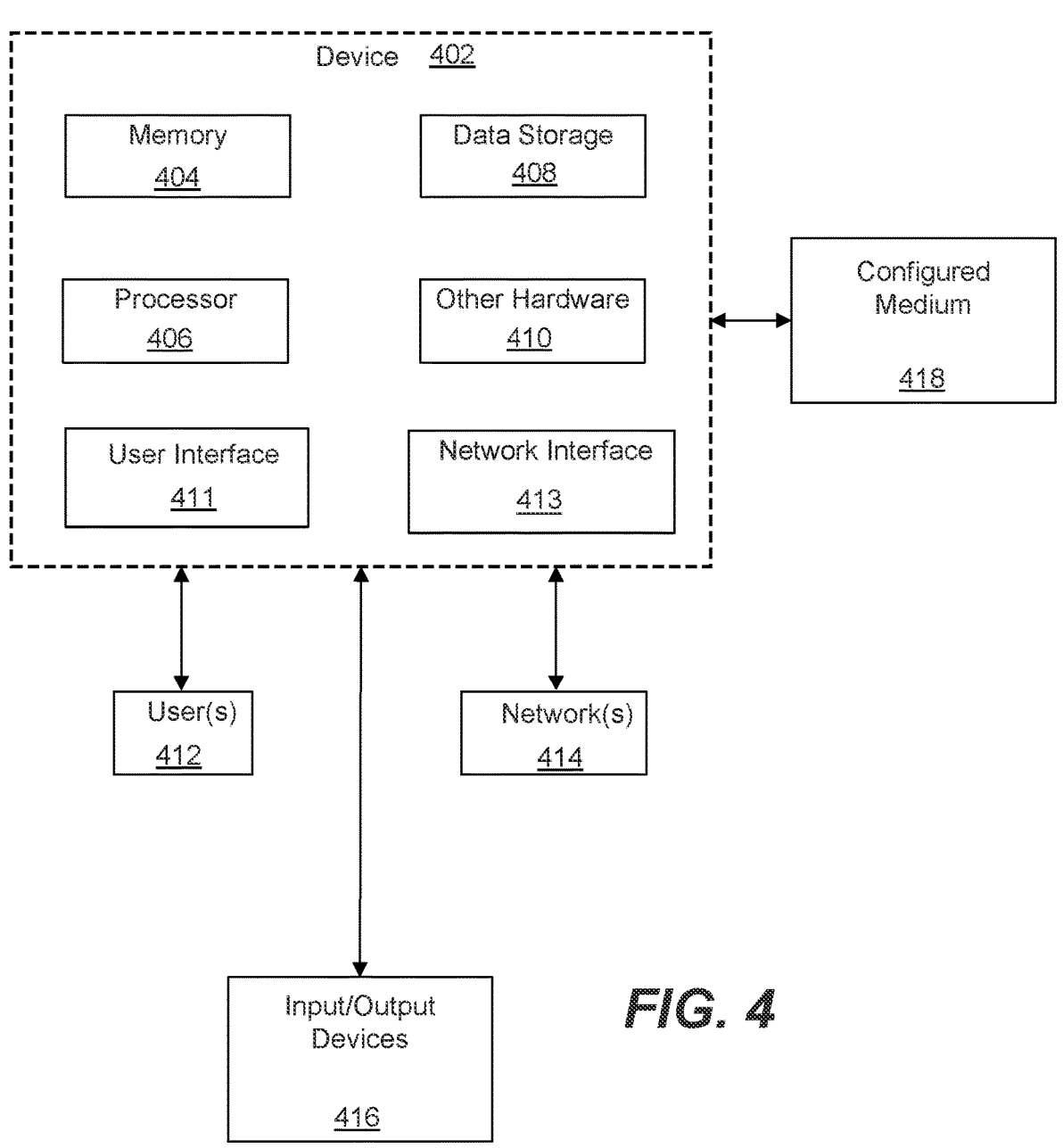
FIG. 4 illustrates an exemplary computer device for performing methods associated with integration of a software component into a software framework, a software framework, and orchestration and integration of data, consistent with some embodiments of the present disclosure.

An exemplary system for implementing various aspects of this disclosure is illustrated in FIG. 4. As illustrated in FIG. 4, an exemplary system may include a general-purpose computing device 402 in the form of a computer. Components of the general-purpose computing device 402 may include, but are not limited to, various hardware components, such as one or more processors 406, data storage 408, a system memory 404, other hardware 410, and a system bus that couples various system components such that the components may transmit data to and from one another. The system bus may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

With further reference to FIG. 4, an operating environment 400 for an exemplary embodiment includes at least one computing device 402. The computing device 402 may be a multiprocessor computing device. An operating environment 400 may include one or more computing devices in a given computer system, which may be clustered, client-server networked, and/or peer-to-peer networked within a cloud. An individual machine is a computer system, and a group of cooperating machines is also a computer system. A given computing device 402 may be configured for end-users, e.g., with applications, for administrators, as a server, as a distributed processing node, and/or in other ways.

Human users 412 may interact with the computer system comprising one or more computing devices 402 by using displays, keyboards, and other input/output devices 416, via typed text, touch, voice, movement, computer vision, gestures, and/or other forms of input/output. A screen may be a removable input/output device 416 or may be an integral part of the computing device 402. A user interface 411 may support interaction between an embodiment and one or more human users. A user interface 411 may include a command line interface, a graphical user interface (GUI), natural user interface (NUI), voice command interface, and/or other user interface (UI) presentations, which may be presented as distinct options or may be integrated.

System administrators, network administrators, software developers, engineers, and end-users are each a particular type of user 412. Automated agents, scripts, playback software, and the like acting on behalf of one or more people may also be users 412. Storage devices and/or networking devices may be considered peripheral equipment in some embodiments and part of a system comprising one or more computing devices 402 in other embodiments, depending on their detachability from the processor(s) 406. Other computer systems not shown in FIG. 4 may interact in technological ways with the computing device 402 or with another system embodiment using one or more connections to a network 414 via network interface 413 equipment, for example.

Each computing device 402 includes at least one logical processor 406. The computing device 402, like other suitable devices, also includes one or more computer-readable storage media including but not limited to memory 404 and data storage 408. The one or more computer-readable storage media may be of different physical types. The media may be volatile memory, non-volatile memory, fixed in place media, removable media, magnetic media, optical media, solid-state media, and/or of other types of physical durable storage media (as opposed to merely a propagated signal). In particular, a configured medium 418 such as a portable (i.e., external) hard drive, CD, DVD, memory stick, or other removable non-volatile memory medium may become functionally a technological part of the computer system when inserted or otherwise installed with respect to one or more computing devices 402, making its content accessible for interaction with and use by processor(s) 406. The removable configured medium 418 is an example of a computer-readable storage medium. Some other examples of computer-readable storage media include built-in RAM, ROM, hard disks, and other memory storage devices which are not readily removable by users 412.

The configured medium 418 is configured with binary instructions that are executable by a processor 406; "executable" is used in a broad sense herein to include machine code, interpretable code, bytecode, and/or code that runs on a virtual machine, for example. The configured medium 418 is also configured with data which is created, modified, referenced, and/or otherwise used for technical effect by execution of the instructions. The instructions and the data configure the memory or other storage medium in which they reside; when that memory or other computer readable storage medium is a functional part of a given computing device, the instructions and data also configure that computing device.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include other hardware logic components 410 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processor(s) 406 (e.g., CPUs, ALUs, FPUs, and/or GPUs), memory/storage media 404, 408, and screens/displays, an operating environment 400 may also include other hardware 410, such as batteries, buses, power supplies, wired and wireless network interface cards, for instance. The nouns "screen" and "display" are used interchangeably herein. A display may include one or more touch screens, screens responsive to input from a pen or tablet, or screens which operate solely for output. In some embodiment, other input/output devices 416 such as human user input/output devices (screen, keyboard, mouse, tablet, microphone, speaker, motion sensor, etc.) will be present in operable communication with one or more processors 406 and memory. Software processes may be users 412.

In some embodiments, the system includes multiple computing devices 402 connected by network(s) 414. Networking interface equipment can provide access to network(s) 414, using components such as a packet-switched network interface card, a wireless transceiver, or a telephone network interface, for example, which may be present in a given computer system. However, an embodiment may also communicate technical data and/or technical instructions through direct memory access, removable non-volatile media, or other information storage-retrieval and/or transmission approaches.

The computing device 402 typically includes a variety of computer-readable media. Computer-readable media may be any available media that can be accessed by the computer and includes both volatile and nonvolatile media, and removable and non-removable media, but excludes propagated signals. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of the any of the above may also be included within the scope of computer-readable media. Computer-readable media may be embodied as a computer program product, such as software stored on non-transitory computer-readable storage media.

The data storage or system memory includes computer storage media in the form of volatile and/or nonvolatile memory such as read only memory (ROM) and random access memory (RAM). A basic input/output system (BIOS), containing the basic routines that help to transfer information between elements within computer, such as during start-up, is typically stored in ROM. RAM typically contains data and/or program modules that are immediately accessible to and/or presently being operated on by processing unit. By way of example, and not limitation, data storage holds an operating system, application programs, and other program modules and program data.

Data storage may also include other removable/non-removable, volatile/nonvolatile computer storage media. By way of example only, data storage may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. A user may enter commands and information through a user interface or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing units through a user input interface that is coupled to the system bus, but may be connected by other interface and bus structures, such as a parallel port, game port or a universal serial bus (USB). A monitor or other type of display device is also connected to the system bus via an interface, such as a video interface. The monitor may also be integrated with a touch-screen panel or the like. Note that the monitor and/or touch screen panel can be physically coupled to a housing in which the computing device is incorporated, such as in a tablet-type personal computer. In addition, computers such as the computing device may also include other peripheral output devices such as speakers and printer, which may be connected through an output peripheral interface or the like.

The computing device may operate in a networked or cloud-computing environment using logical connections to one or more remote devices, such as a remote computer. The remote computer may be a personal computer, a server, a router, a network PC, a peer device or other common network node, and typically includes many or all of the elements described above relative to the computer. The logical connections may include one or more local area networks (LAN) and one or more wide area networks (WAN), but may also include other networks. Such networking environments are commonplace in offices, enterprise-wide computer networks, intranets, and the Internet.

When used in a networked or cloud-computing environment, the computing device may be connected to a public or private network through a network interface or adapter. In some embodiments, a modem or other means may be used for establishing communications over the network. The modem, which may be internal or external, may be connected to the system bus via a network interface or other appropriate mechanism. A wireless networking component such as one comprising an interface and antenna may be coupled through a suitable device such as an access point or peer computer to a network. In a networked environment, program modules depicted relative to the computer, or portions thereof, may be stored in the remote memory storage device. It may be appreciated that the network connections shown are exemplary and other means of establishing a communications link between the computers may be used.

Integration

Exemplary disclosed embodiments include devices, systems, methods, and computer readable media for the validation of a software component after or when the software component is integrated into a software framework. For example, in some embodiments, and as illustrated in FIG. 4, a system 400 may include at least one computing device 402, the at least one computing device 402 including at least one processor 406, at least one memory 404, at least one data storage 408, other hardware 410, a connected configured medium 418, and at least one communication interface (e.g., a user interface 411, a network interface 413).

Figure 5:
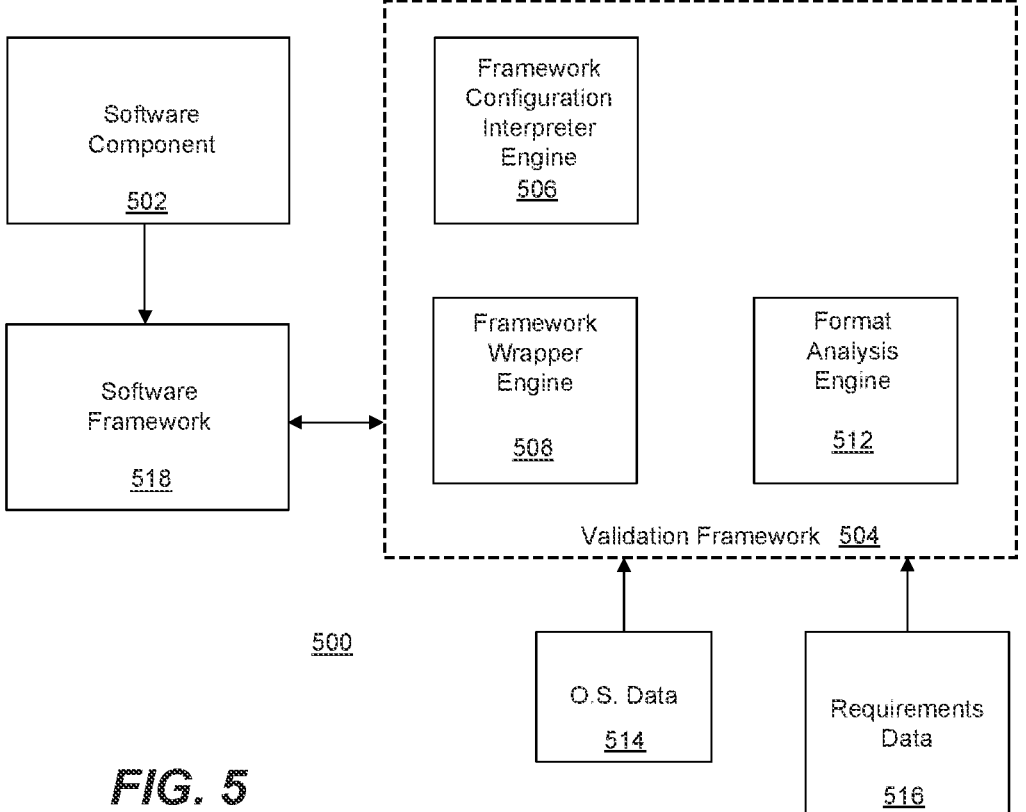
FIG. 5 illustrates an exemplary system for performing methods associated with integration of a software component into a software framework, consistent with some embodiments of the present disclosure.

Consistent with disclosed embodiments, and by way of example, FIG. 5 illustrates an exemplary system 500 for validating a software component 502 after, or when, the software component 502 is integrated into a software framework 518. As used herein, a software component 502 may refer to a discrete piece of code, or a sequence of instructions, which can be independently created and maintained to be used in different systems. For example, a system may be configured for validating the integration of a software component 502 (e.g., a module or a capability) into a software framework 518. Software modules may be included as part of a program that contains one or more routines, each routine comprising a sequence of instructions, wherein one or more routines may make up a software module, and wherein one or more software modules may make up a program or engine. As used herein, a software framework 518 may refer to a set of software programs or engines that provides generic functionality and a set of software programs or engines that can be modified. Generic functionality, as used herein, refers to a functionality irrespective of data type. The exemplary set of instructions that may be executed by at least one processor for the validation of a software component to be integrated into a software framework.

Figure 1:
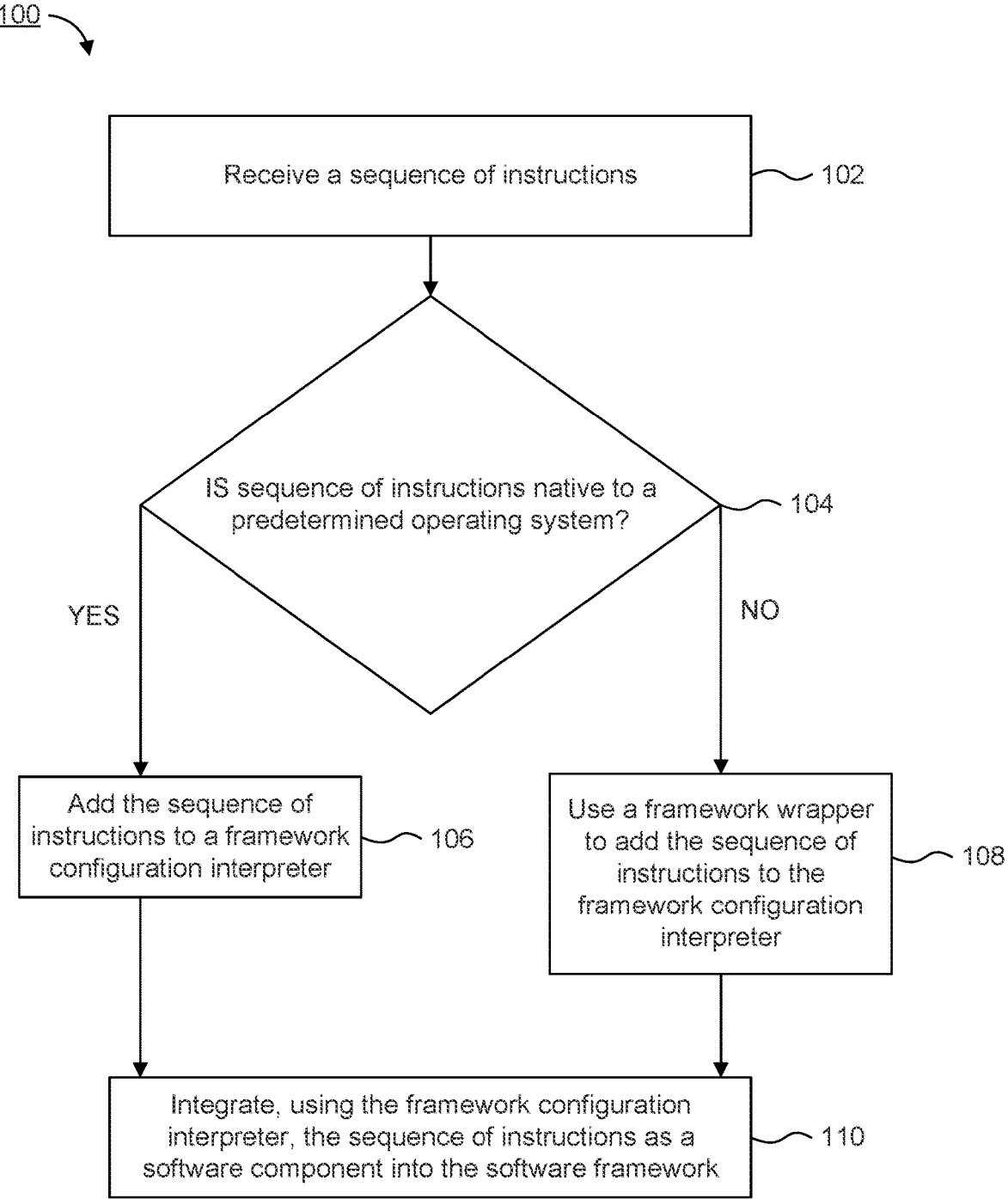
FIG. 1 illustrates an exemplary method for integration of a software component into a software framework, consistent with some embodiments of the present disclosure.

In exemplary embodiments, a software that performs an algorithm in accordance with that illustrated in FIG. 1 may be expressed by the following pseudo-code example:

```
**** Pseudo code Example ****
instructionsReceived = receive(sequence of instructions)
operatingSystems[ ] = receive(setOfPredeterminedOS)
for each operatingSystems[n]
x = 0
flag = 0
instructionsNative = testNativeOS(instructions received)
for x < n-1
            if instructionsNative = operatingSystems[x]
                  flag = 1;
            else
                  n++1
if flag=1
            Integrand = frameworkConfigurationInterpreter(instructionsReceived)
else
            Integrand =
            frameworkConfigurationInterpreter(frameworkWrapper(instructionsReceived)
integrate(integrand)
****
``` software framework 518 may further allow users to build and deploy applications and may provide functionality as part of a larger software platform to facilitate the development of software applications. Some non-limiting examples of a software framework 518 may include ACTIVEX, .NET, COCOA, COCOA TOUCH, ANDROID APPLICATION FRAMEWORK, and other similar framework types. For example, a user may upload a software component 502 including a sequence of instructions (e.g., a script) to a platform-specific directory of a software framework 518 (e.g., COCOA) and validate that software component 502 via a validation framework 504 in communication with the software framework 518. After validation of the software component 502 via an implementation of the validation framework 504, the software component 502 including the validated sequence of instructions, which may also be designed to work within the constraints of a particular operating system, may be fully integrated into the software framework 518 via an upload of the sequence of instructions to the platform-specific directory without requiring any further deployment or installation of software or hardware within the software framework 518 and without requiring any further intervention by a user or system administrator. Furthermore, because the software framework 518 may remain in communication with the validation framework 504, the software framework 518, as well as any incorporated software component 502, may provide various functionalities which may be utilized independently for various additional validation purposes and without having any limitations based on larger software platforms of which the software framework 518 may be a part.

Consistent with disclosed embodiments, an exemplary system may be configured to receive a software component 502 including a sequence of instructions, e.g., for integration and subsequent execution of the sequence of instructions within a software framework 518. As used herein, a sequence of instructions may refer to a set of logical steps or code to be executed. Some non-limiting examples may include a script, a program, a tool, or any other instruction or code which may be interpreted or carried out by at least one processor. By way of example, FIG. 1 illustrates an It will be appreciated that the functions utilized in the pseudo code example disclosed herein (e.g., for, if, else, =, etc.) represent basic coding functions that exist in many forms of known programming languages. It will further be appreciated, as taught by basic computer science, that the specific programmatic implementation of these basic functions and their many equivalents are a matter of design preference and may be implemented in code in numerous ways using well known combinations of source code functions.

In some embodiments, a user may upload a software component 502 including a sequence of instructions to a platform-specific directory of the software framework 518. As used herein, a platform specific directory may include a folder or storage location in a file system cataloging structure which contains references to one or more computer files and/or references to other folders, storage locations, or other directories. Non-limiting examples of storage locations may include a folder on a computer hard drive. By way of example, a platform-specific directory may be a folder on a computer executing a WINDOWS 10 operating system (or any other WINDOWS operating system). As another example, a platform-specific directory may be a folder in the file system of a computer executing a LINUX, MACOS, or UNIX operating system (or any other operating system). The platform-specific folder of a particular software framework 518 may be identified, e.g., in one or more configuration files, in a registry, or in a table value. In some embodiments the platform-specific folder is static, and in other embodiments, it is dynamic and may change based on, e.g., platform context and/or a particular use case.

Consistent with disclosed embodiments, an exemplary system 500 may be configured to determine, via a format analysis engine 512 of the validation framework 504, whether the uploaded software component 502 including a sequence of instructions is native (i.e., has a formatting native) to a predetermined operating system. As used herein, "native" may refer to a format or software designed to run on a specific platform (e.g., PYTHON, POWERSHELL, etc.). A non-limiting example of native may refer to a computer application program compiled to run with a particular processor and it's set of instructions. As used herein, operating system may refer to system software that manages computer hardware, software resources, and provides common services for computer programs. Some non-limiting examples of an operating system may include versions of MICROSOFT WINDOWS, APPLE MACOS, CHROME OS, LINUX, an open-source operating system, UNIX, or any other similar system.

Consistent with disclosed embodiments, the system 500 may be configured to add a software component 502 including a sequence of instructions to a framework configuration interpreter engine 506 when the sequence of instructions is determined to be native, via a format analysis engine 512, to a predetermined operating system. As used herein, a framework configuration interpreter engine 506 may refer to a hardware component comprising a software component, software module, subroutine, and/or instructions that cause a processor to operate on information provided to it and extract properties which are then codified. For example, a framework configuration interpreter engine 506 may take a software component and/or a sequence of instructions input by a user and convert that software component and/or sequence of instructions into a format which is comprehensible by a software framework. As such, the framework configuration interpreter engine 506 and the format analysis engine 512 may be used to cause a processor to rapidly and successfully implement a broad range of analysis techniques. For example, the format analysis engine 506 may allow the validation framework 504 to be configured to determine an operational state of a process and validate (i.e., confirm) that the operational state is in a known, or native, operating condition. The term "native," as used herein refers to whether the sequence of instructions is compatible with or capable of being executed on a computer running a particular operating system (e.g., a computer of a software framework 518). For example, a set of instructions written in JSON and compiled may be natively executed on any one of MICROSOFT WINDOWS, APPLE MACOS, CHROME OS, LINUX, or UNIX operating systems, and the format analysis engine 512 may allow for the identification of the JSON format of the set of instructions. As another example, the system 500 may be configured to add a sequence of instructions (e.g., a script) from a software component 502 to a framework configuration interpreter engine 506 when the sequence of instructions is compatible with or capable of being executed on a predetermined operating system (e.g., WINDOWS, LINUX, UNIX, or OS X), as determined by the format analysis engine 512, based on the operating system data (O.S. data) 514 provided, e.g., by the software framework 518 to the validation framework 504. Via the framework configuration interpreter engine, the native (e.g., JSON) sequence of instructions may be further converted, e.g., into binary or bits, such that the software framework may understand it at the lowest level. Adding a software component including, e.g., a sequence of instructions to a framework, may be carried out, for example, by defining conditions for a given module in a particular configuration file (e.g., a JSON file) and moving the particular configuration file into a folder. In turn, and continuing the example, the configuration file may determine the data to be reviewed and the known operational state of the process that is codified in the data.

Alternatively, consistent with disclosed embodiments, the system may be configured to use a framework wrapper engine 508 to adapt the software component including a sequence of instructions prior to the software component being added to the framework configuration interpreter engine 506 when the sequence of instructions is determined, via the format analysis engine 512, as not native to a particular operating system, and then adding the adapted sequence of instructions to the framework configuration interpreter engine. As used herein, a framework wrapper engine 508 may refer to hardware with program instructions and/or software code, that creates a wrapping around other program components in their original form in order to, e.g., facilitate data abstraction and/or data conversion when the original format of the program instructions or software code is not compatible with a particular operating system. I.e., the framework wrapper engine converts a non-native data format into a native format which is compatible with a particular software framework and its data type requirements. For example, a framework wrapper engine 508 may adapt (e.g., convert) data into a compatible format, hide the complexity of an underlying entity using abstraction, or hide the complexity of any other entity that encapsulates another item. Non-limiting examples of framework wrapper engines 508 include object wrappers, function wrappers, driver wrappers, or other framework wrappers. For example, the system 500 may be configured to use a framework wrapper engine 508 to adapt a sequence of instructions and then add the adapted sequence of instructions (e.g., a script) to a framework configuration interpreter engine 506, particularly when the original sequence of instructions is not native to a predetermined operating system (e.g., MICROSOFT WINDOWS).

An exemplary framework wrapper engine 508 that may be useful in various embodiments is a framework wrapper engine 508 that is connected to a database (e.g., an ORACLE database) in order to perform queries to the database and correlate query results to known values. Another exemplary framework wrapper engine 508 may comprise SELENIUM code which is compiled to perform functional testing of an application, the results of which are then reviewed via the validation framework 504.

Consistent with disclosed embodiments, the system may be configured to integrate, using the framework configuration interpreter engine 506, the sequence of instructions as a software component 502 into the software framework 518. As used herein, integrate may refer to combining, either physically or virtually, one thing with another so that they become a whole. For example, the system may be configured to combine or add, using the framework configuration interpreter engine 506, a sequence of instructions (e.g., a script) as a software component (e.g., a module or a capability) 502 to the software framework (e.g., COCOA) 518. In exemplary embodiments, the framework configuration interpreter engine 506 interprets one or more configuration files, or identifies the existence of one or more configuration files and then interprets the one or more configuration files, to determine if the one or more configuration files provide a new module or capability, and if so, how that new module or capability is to be utilized and/or how that new module or capability is to become a part of (or react with) the software framework 518. In some embodiments, the one or more configuration files may comprise, e.g., one or more JSON configuration files which describe how new modules/capabilities are to be created and integrated into the software framework. In turn, the software framework 518 may, via the framework configuration interpreter engine 506, determine that the new modules/capabilities have appeared and further allow for the new modules/configurations to be used via the one or more configuration files.

In some embodiments, integration of a software component 502 into a software framework 518 may be automated.

As used herein, automated may refer to a programmed or computerized method carried out by a machine or computer without the need for human control or direction. For example, integration of a software component 502 (e.g., a module) to a software framework 518 (e.g., COCOA) may be automated.

In some embodiments, a software component 502 may include a validation software component. As used herein, validation may refer to a process of ensuring that data is sensible and feasible. As used herein, sensible may refer to an object or data that is practical and/or functional. As used herein, feasible may refer to an object or data that is likely and/or probable. Some non-limiting examples of validation may include data type validation, range and constraint validation, code and cross-reference validation, format validation, structured validation, consistency validation, requirements validation, usability validation, uniqueness validation, or any other process of ensuring that data is sensible and feasible. For example, data type validation may include verifying that individual characters are consistent with expected characters of one or more known primitive data types as defined in a programming language or data storage and retrieval mechanism. For example, range and constraint validation may examine data for consistency with a minimum/maximum range, or consistency with a test for evaluating a sequence of characters, such as one or more tests against regular expressions. In another example, code and cross-reference validation may refer to verifying that data is consistent with one or more possibly external rules, requirements, or collections relevant to a particular organization, context, or set of underlying assumptions. In yet another example, structured validation may refer to allowing for the combination of other kinds of validation, along with more complex processing. A complexity of processing may refer to, e.g., a number of instructions, configurations, relationships, or events. With a greater number of instructions, configurations, relationships, or events associated with the processing steps, the processing becomes more complex. In a further example, consistency validation may ensure that data is logical.

According to another embodiment of the present disclosure, a method for integration of a software component into a software framework may be provided. By way of example, FIG. 1 illustrates an exemplary method 100 for integration of a software component into a software framework. As illustrated in FIG. 1, method 100 may include a step 102 of receiving a sequence of instructions for the software component. One of ordinary skill in the art will appreciate that a sequence of instructions can be received by suitable methods. For example, a sequence of instructions can be received by causing one or more processes to access, in a local or remote data store, a file containing the sequence of instructions, or a sequence of instructions can be received from a user interface (e.g., a keyboard) and mapped to a memory address, or a sequence of instructions can be referenced as an address in memory, or a sequence of instructions can be received into a network interface and mapped to a memory address or stored as a file in a local data store, or a sequence of instruction can be retrieved from a cloud based storage, or a sequence of instructions may be retrieved from a local or remote database, or a sequence of instructions may be published as an event in an event streaming layer. In exemplary disclosed embodiments, a software framework may receive a sequence of instructions as a file that is received when it is saved into a specifically configured folder or storage location within the software framework.

Method 100 may also include a step 104 of determining whether the sequence of instructions is native to a predetermined operating system. In some embodiments, determining whether the sequence of instructions is native to a predetermined operating system may comprise determining native scripting by definition, thereby enabling only the existence of native scripting for a given module or capability (e.g., only enabling a software designed to run on a specific platform). Thus, for example, a computer application program embodied in the sequence of instructions may be required, by definition, to be written in the defined script and be compiled to run with a particular processor.

Further, method 100 may include a step 106 of adding the sequence of instructions to a framework configuration interpreter engine based on the condition that the method determines that the sequence of instructions is native to a predetermined operating system. In some embodiments, adding the sequence of instructions to a framework configuration interpreter engine when the sequence of instructions is native to a predetermined operating system may comprise, e.g., inserting text into a file or moving one or more text-based scripting files into a folder.

Method 100 may further include a step 108 of using a framework wrapper engine to adapt the sequence of instructions to be added to the framework configuration interpreter engine based on the condition that the method determines that the sequence of instructions is not native to a predetermined operating system, and then adding the adapted sequence of instructions to the framework configuration interpreter engine. In some embodiments, the method may include applying the framework wrapper engine to adapt the sequence of instructions to form a native wrapped sequence of instructions for the predetermined operating system, thereafter providing (i.e., adding) the wrapped sequence of instructions to the framework configuration interpreter engine. Providing the wrapped sequence of instructions to the configuration interpreter engine may comprise, e.g., inserting text into a file or moving one or more text-based scripting files into a folder.

Method 100 may include a step 110 for integrating, using the framework configuration interpreter engine, the sequence of instructions as a software component into the software framework. "Integrating," as used herein, refers to combining two or more components which work together in order to form a unit. In some embodiments, the integrated software component may include a validation software component. In some embodiments, the integration of the software component to the software framework may be automated. In some embodiments, the sequence of instructions (either a native sequence of instructions or a wrapped sequence of instructions) may be uploaded to a platform specific directory of the software framework.

According to another embodiment of the present disclosure, a non-transitory computer readable medium comprising instructions to perform steps for integration of a software component into a software framework may be provided. The steps embodied in the instructions of the non-transitory computer readable medium may mirror the steps of the method 100 described herein. As such, the steps may include receiving or uploading a sequence of instructions. The steps may further include determining whether the sequence of instructions is native to a predetermined operating system. The steps may also include adding the sequence of instructions to a framework configuration interpreter engine when the sequence of instructions is native to a predetermined operating system. Alternatively, when the sequence of instructions is not native to a predetermined operating system, the steps may include using a framework wrapper engine to adapt the sequence of instructions to be added to the framework configuration interpreter engine and then adding the adapted, or wrapped, sequence of instructions to the framework configuration interpreter engine. The steps may also include integrating, using the framework configuration interpreter engine, the sequence of instructions as a software component into the software framework. In some embodiments, the software component may include a validation software component. In some embodiments, the integration of the software component to the software framework may be automated. In some embodiments, a user may upload the sequence of instructions to a platform-specific directory or folder within the software framework.

Software Framework

Exemplary disclosed embodiments also include devices, systems, and computer readable media for a software framework comprising an integrated validated software component. For example, in some embodiments, a system may include at least one computing device 402, the at least one computing device 402 including at least one processor 406, at least one memory 404, at least one data storage 408, other hardware 410, a connected configured medium 418, and at least one communication interface (e.g., a user interface 411, a network interface 413).

Figure 6:
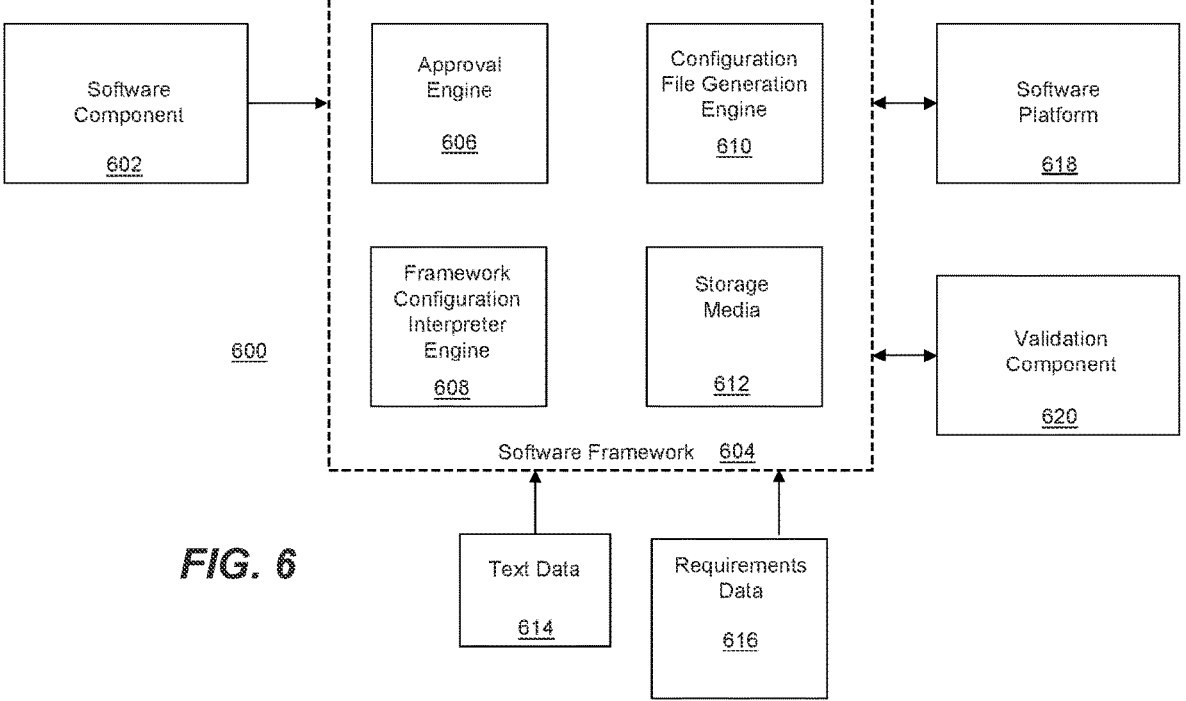
FIG. 6 illustrates an exemplary system for performing methods associated with providing a software framework, consistent with some embodiments of the present disclosure.

Consistent with disclosed embodiments, and by way of example, FIG. 6 illustrates an exemplary system 600 may be configured to receive a user-inputted software component 602, wherein the user-inputted software component 602 is evaluated by an approval engine 606, the evaluation being based on a predetermined approval condition. As used herein, a user-inputted software component 602 may refer to a discrete piece of code (i.e., a sequence of instructions) inputted by a user which can be independently created and maintained for use and reuse in one system or various different systems. As used herein, an approval condition may refer to a rule or instruction that indicates whether a certain action or result may occur. The rule or instruction may be input to the software framework 604 via, e.g., text data 614 which is stored in, e.g., a text file within a storage media 612 of the software framework 604, wherein the rule or instruction provided by the text data 614 and stored in the text file contains a validation definition which enables the software framework 604 to determine, via the approval engine 606, either a passing or a failing result when performing a validation of the user- or otherwise-inputted software component 602. A non-limiting example of a predetermined approval condition may comprise a rule requiring a certain type (e.g., a data type, a format type, etc.) of a software component, and if the user-inputted software component 602 does not match the predetermined approval condition, then the user-inputted software component 602 is determined by the approval engine 606 to fail the predetermined approval condition. Other non-limiting examples of a predetermined approval condition may comprise a rule requiring one or more parameters, characteristics, features, conditions, or prerequisites for a user- or otherwise-inputted software component, such as a certain size, type, or other similar trait or characteristic of the software component. For example, certain types of software components may refer to only those software components created on a certain date and onward (or those in a particular date range), those below a specific size requirement, whether the component is of a particular file type, whether the software component contains structured data or unstructured data, whether the software component adheres to a specific schema or specification, or any other similar requirement or nonrequirement provided in, e.g., a documented requirements specification, wherein the documented requirements specification may be represented by data stored in storage media 612 after being input to the software framework 604 as requirements data 616. The predetermined approval condition may allow the software framework 604 to automatically validate a software component 602 which is input to the software framework 604. As such, the disclosed exemplary software framework 604 is an improved framework which doesn't require intervention for validation by, e.g., a user, a manager, a subject matter expert, or another entity. Instead, the software framework 604 is configured to comprise at least one approval condition stored in storage media 612 prior to receiving an input of a software component 602, wherein the at least one approval condition is utilized for validation automatically via the approval engine 606 upon input of the software component 602 to the software framework 604. Consistent with disclosed embodiments, the system may be further configured, via at least one processor, to determine whether the user-inputted software component 602 exists within a software framework 604. As used herein, a software framework 604 may refer to a software that provides generic functionality and can be modified. The software framework 604 may allow users to build and deploy applications and may provide functionality as part of a larger software platform 618 to facilitate the development of software applications. Some non-limiting examples of a software framework 604 may include ACTIVEX, .NET, COCOA, COCOA TOUCH, ANDROID APPLICATION FRAMEWORK, and other similar types. As used herein, determining whether the software component 602 exists may include deciding, identifying, or finding out, via at least one processor, whether the software component 602 is present or included in part or in whole within the software framework 604. Thus, for example, the system 600 may be configured to determine, via at least one processor, whether the user-inputted software component 602 is already present or included in the software framework 604. In exemplary embodiments, to determine whether the user-inputted software component 602 is already present or included in the software framework 604, the at least one processor may be configured to, e.g., evaluate a corresponding file name against a file manifest of the software framework 604, evaluate a component name against a component manifest of the software framework 604, and/or perform a search for at least part of the software component 602 within the instructions already present in the software framework 604, all based on the user- or otherwise-inputted software component 602 and without requiring further intervention by the user, a manager, an administrator, a subject matter expert, or another entity. The disclosed exemplary improved software framework 604 thereby may automatically determine whether an input software component 602, or a portion thereof, is already included in the software framework 604. Instead of requiring further intervention, the software framework 604 may be configured to evaluate the software component 602 against files, components, and instructions already present within the software framework 604, which may occur automatically upon an input of the software component 602 by a user or other entity.

Consistent with disclosed embodiments, when the user-inputted software component is determined, via at least one processor, to exist within the software framework 604, the system 600 may further comprise a configuration file generation engine 610, wherein the configuration file generation engine 610 is configured to create a configuration file, wherein the configuration file is created subject to the predetermined approval condition such that the predetermined approval condition is automatically met and/or remains satisfied. As used herein, a configuration file may refer to a file that is stored in storage media 612 and is used to configure one or more parameters and/or initial settings for a computer program (i.e., a software component 602) which is to be integrated into a software framework 604. Some non-limiting examples of configuration files may include configuration files for UNIX and UNIX-like operating systems (e.g., .cnf, .conf, .cfg, .cf, or .ini), for MS-DOS (e.g., CONFIG.SYS), for MICROSOFT WINDOWS (e.g., WINDOWS Registry), for MACOS (e.g., the Property list, .plist), or other similar types of files. For example, if the user-inputted software component 602 (e.g., a software component which provides a new module or a new capability) already exists within the software framework 604 (e.g., COCOA), the configuration file generation engine 610 may automatically create the configuration file, wherein the configuration file is automatically subject to a predetermined approval condition. The configuration file, in turn, may provide instructions regarding the new module or capability, as well as instructions on how the new module or capability is to be utilized and/or how the new module or capability is to become a part of (or react with) the software framework 604. Some non-limiting examples of creating a configuration file may further include using tools provided by applications within the software framework 604 to create, modify, and/or verify the syntax of a configuration file. System administrators may also manually create and modify configuration files using a text editor; however, the configuration file generation engine 610 allows for the configuration file to be generated automatically without requiring intervention by a user, manager, system administrator, subject matter expert, or another entity. For example, the configuration file may be generated via the configuration file generation engine 610 upon a determination by at least one processor that the software component 602 exists within the software framework 604, wherein the configuration file is generated subject to a predetermined approval condition (e.g., a condition that the configuration file extension or type must match the operating system), all of which occurs without requiring any input after the software component 602 is input to the software framework 604.

Alternatively, when the at least one processor determines that the user-inputted software component 602 does not exist within the software framework, the system 600 may be configured to first integrate the user-inputted software component into the software framework and then create a configuration file subject to the predetermined approval condition. For example, if the user-inputted software component 602 (e.g., a module or a capability) does not exist within the software framework 604 (e.g., COCOA), a system 600 may be configured to automatically integrate (e.g., via a framework configuration interpreter engine 608) the user-inputted software component 602 into the software framework 604 and then create a configuration file (e.g., via a configuration file generation engine 610), wherein the configuration file is automatically generated subject to the predetermined approval condition. It will be appreciated that the manner in which a software component 602 is integrated into a software framework 604 may differ based on a specific component or framework. In exemplary embodiments, a software component 602 may be integrated into a software framework 604 by, e.g., inserting text into a file for upload to the software framework 604 or moving one or more text-based scripting files into a folder (i.e., storage media 612) of the software framework 604, wherein the uploading or the moving of text causes a framework configuration interpreter engine 608 to integrate the software component 602 into the software framework 604, wherein after the software component 602 is integrated, a configuration file generation engine 610 creates one or more configuration files for the software component 602 subject to the predetermined approval condition.

Consistent with disclosed embodiments, the system 600 may be configured to determine whether the configuration file meets the predetermined approval condition. For example, the system 600 may be configured to determine (e.g., yes it does or no it does not), via an approval engine 606, whether a configuration file (e.g., a .cnf file extension) generated by the configuration file generation engine 610 meets a predetermined approval condition (e.g., a condition or requirement that the user-inputted software component or the configuration file matches the operating system type). A positive result of such a determination would, e.g., confirm that the configuration file generation engine 610 is generating configuration files which are subject to the predetermined approval condition.

Advantageously, if the configuration file is determined, via the approval engine 606, to meet the predetermined approval condition, the system 600 may be configured to add the respective configuration file to the software framework 604. In some embodiments, adding a configuration file may comprise storing the configuration file in storage media 612, e.g., a folder within the software framework 604, for retrieval by orchestration at runtime. As used herein, a folder may refer to a virtual location for applications, documents, data, or other subfolders. In some embodiments, as used herein, a folder may refer to a file envelope structure defined within a file system, e.g., a "folder" within the WINDOWS file system or a "directory" within a LINUX file system. As used herein, retrieve may refer to accessing stored data or files in a computer, e.g., stored data or file within storage media 612. As used herein, orchestration may refer to one or more of automated configuration, coordination, and management of a computer system, systems, or software. As used herein, configuration may refer to the arrangement of hardware and/or software of a computer system or network. As used herein, coordination may refer to a programming language coordinating instruction, an operating system coordinating access to hardware, a database transaction schedule coordinating access to data, or any other similar process involving coordination. As used herein, management may refer to a process of managing, monitoring, maintaining, or optimizing a computer system for performance, availability, security, and/or any base operational requirement. As used herein, runtime may refer to a time in which code is being executed on a computer's central processing unit (CPU) as machine code. In some embodiments, the configuration file may be in human readable format. As used herein, human readable format may refer to a medium or format in which an encoding of data or information can be naturally read by a human. Non-limiting examples of human readable format may include ASCII or Unicode text.

Consistent with disclosed embodiments, the system 600 may be configured to orchestrate the software framework 604. The orchestration may be performed at any point in time.

Consistent with disclosed embodiments, the system 600 may be configured to provide pass and fail responses for a user-inputted software component 602. As used herein, a pass response may refer to an output or response indicating that an action was successful. Alternatively, as used herein, a fail response may refer to an output or response indicating that an action was not successful. For example, the system 600 may be configured to provide pass and fail responses of a user-inputted software component 602 (e.g., a module or a capability). As another example, the system 600 may provide a fail response, via an approval engine 606, of the user-inputted software component 602 when the software component 602 is determined, via the approval engine 606, not to match a data type which is required by a predetermined approval condition, e.g., a predetermined approval condition requiring a specific data-type software component. As yet another example, the system 600 may provide a pass response, via an approval engine 606, of the user-inputted software component 602 when the software component 602 is determined, via the approval engine 606, to match a data type which is required by a predetermined approval condition, e.g., a predetermined approval condition requiring a specific data-type software component.

In some embodiments, the software framework 604 may include or be connected with a validation component 620. As discussed above, validation may refer to a process of ensuring that data is sensible and feasible. Some non-limiting examples of validation may include data type validation, range and constraint validation, code and cross-reference validation, format validation, structured validation, consistency validation, requirements validation, usability validation, uniqueness validation, or any other process of ensuring that data is sensible and feasible. For example, a software component 602 may receive, operate on, and/or output certain data according to specific data types, and a validation component 620 may validate that all inputs, internal operations, and outputs adhere to a set of required data types within the software framework 604. In other embodiments, only inputs and outputs to/from the software framework 604 may be subjected to a data type validation via a validation component 620, while data operations internal to the software framework 604 may include any data type. In other embodiments, validating a software component 602 may comprise validating the software component 602 via the validation component 620 as a whole rather than portions of data or data types. A non-limiting example of validating a software component 602 as a whole may be providing a predetermined approval condition that an application has a predetermined number of operational containers (e.g., 5 operational containers) at the time of validation.

In some embodiments, the software framework 604 may be modular. As used herein, modular may refer to a software design technique that emphasizes separating the functionality of a program into discreet, independent, and/or interchangeable modules, such that each module contains everything necessary to execute only one aspect of a desired functionality. For example, most programming languages are modular and are generally divided into three levels: (1) functions within files, (2) files within repositories/libraries, and (3) libraries/repositories within projects. In some embodiments, the software framework 604 may be platform agnostic. As used herein, platform agnostic may refer to hardware and/or software that is compatible with many types of platforms or operating systems, and which can thereby run on any combination of operating system(s) and underlying processor architecture(s). As used herein, a computing platform or a digital platform may be an environment in which a piece of software is executed. For example, the environment may comprise hardware, an operating system, a web browser, and/or any other software. In some embodiments, the software framework 604 may be modular, platform agnostic, or both modular and platform agnostic.

As used herein, a modular software framework may be defined as a software framework which comprises individual modules, each individual module comprising particular script portions written to perform a certain task. When creating a set of desired functions, the individual modules may be combined to interact with one another or to be performed in a particular order such that a larger script is formed in order to perform the desired set of functions (e.g., to perform a validation test). Each module thereby may represent a customizable and/or removeable portion of a larger script. A modular framework may thus allow testers (i.e., users) to divide a software application into multiple portions to create specific and custom test scripts based on particular desires and requirements at issue. For example, the software framework 604 may include individual modules for an approval engine 606, a framework configuration interpreter engine 608, and a configuration file generation engine 610.

As used herein, the term "agnostic" (e.g., provider-agnostic, platform-agnostic) refers to the lack of any requirement of a particular system, provider, developer, or platform for functionality of the framework. Platform agnosticism may allow for the development of reusable logical parts that can be used across different types of applications. For example, many components of an agnostic framework may be re-used without requiring changes across different underlying server frameworks and even without requiring changes across different types of applications (e.g., HTTP server frameworks, microservices with different transport layers, and Web Sockets).

Across the different tools available for validation testing and validation frameworks, most applications can only support a limited selection of test frameworks and third-party tools. This is due to either (1) rigid legacy systems which prevent versatility; and/or (2) the investment-bar (i.e., cost) for ensuring that each new release of each testing framework will function properly with the particular hardware and software. Thus, most services choose not to be framework agnostic, and most frameworks are, in turn, not platform- or provider-agnostic. An exemplary software framework 604, consistent with embodiments of the present disclosure, in contrast, may be flexible and independent in terms of compatible providers, tools, and platforms. With such flexibility, users and system administrators are not required to adapt their workflows, test cases, and/or scripts to be compatible with a single software provider or platform. Instead, users may run their tests as needed, based on the particular requirements and conditions, as defined by, e.g., text data 614 and requirements data 616, in any given scenario and not based on a particular provider with which the framework may be built to be aligned. As such, the same exemplary software framework 604 may be utilized for validation testing, configuration, and integration of various software components without requiring multiple frameworks, software providers, or other entities.

According to another embodiment of the present disclosure, a method for a software framework may be provided. By way of example, FIG. 2 illustrates an exemplary method for a software framework.

Figure 2:
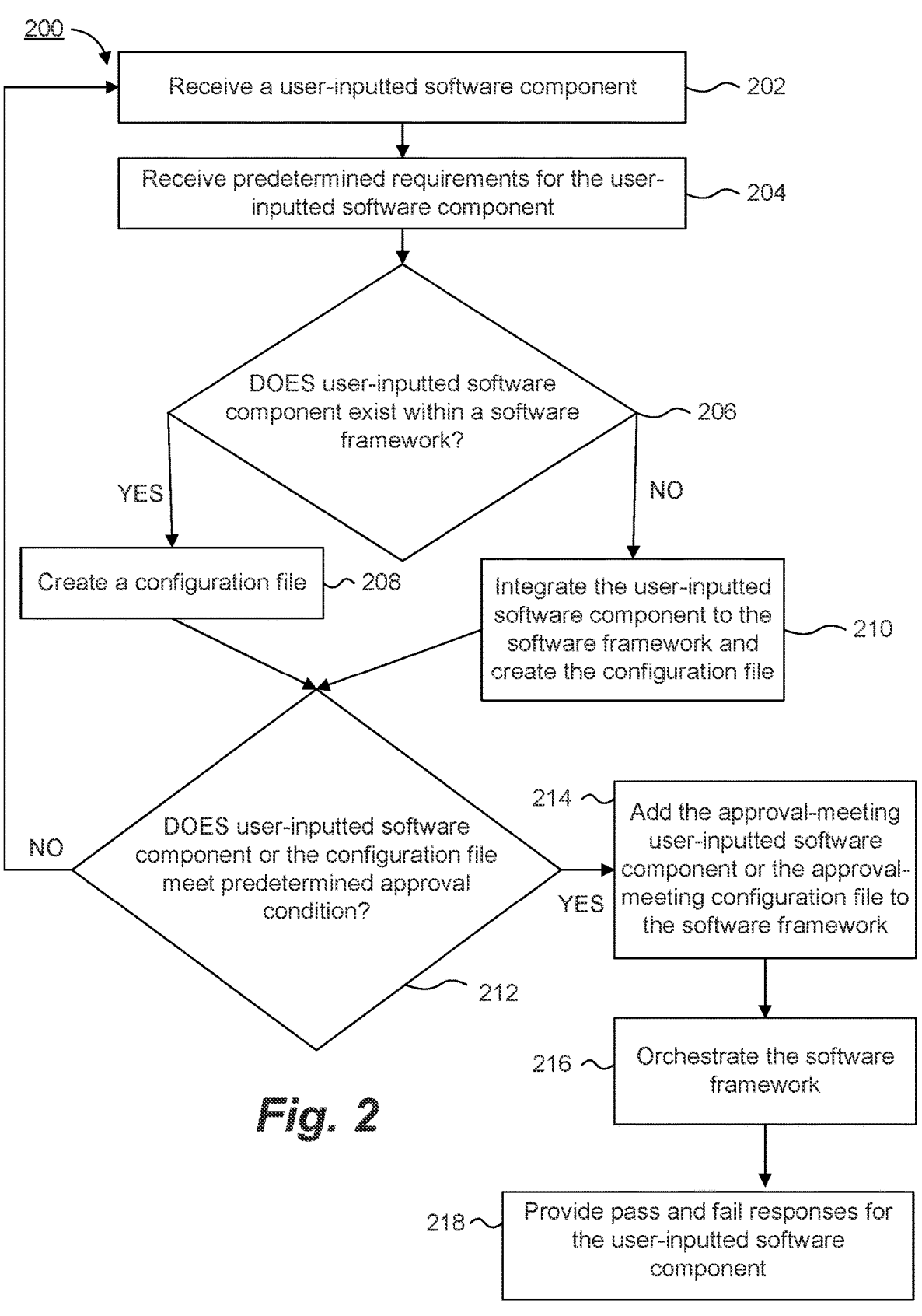
FIG. 2 illustrates an exemplary method for a software framework, consistent with some embodiments of the present disclosure.

As illustrated in FIG. 2, method 200 may include a step 202 of receiving a user-inputted software component, wherein the user-inputted software component is subject to a predetermined approval condition. One will appreciate that a user-inputted software component can be received by suitable methods. For example, a user-inputted software component can be received by configuring one or more processors to access, in a local or remote data store, a file containing a user-inputted software component, or a user-inputted software component can be received from a user interface (e.g., a keyboard) and mapped to a memory address, or a user-inputted software component can be referenced as an address in memory, or a user-inputted software component can be received into a network interface and mapped to a memory address or stored as a file in a local data store, or a user-inputted software component can be retrieved from a cloud based storage, or a user-inputted software component may be retrieved from a local or remote database, or a user-inputted software component may be published as an event in an event streaming layer. In exemplary disclosed embodiments, a software framework receives a user-inputted software component as one or more files that are received when saved into a specifically configured folder or storage location.

Method 200 may also include a step 204 of receiving predetermined requirements for the user-inputted software component. As an example, receiving predetermined requirements for the user-inputted software component may comprise receiving the predetermined requirements via text data or requirements data from a user-generated configuration file (e.g., a JSON configuration file).

Further, method 200 may include a step 206 of determining whether the user-inputted software component exists within a software framework. The method may allow users to build and deploy applications and may provide a functionality of a software framework as part of a larger software platform to facilitate the development of software applications. Some non-limiting examples of a software framework may include ACTIVEX, .NET, COCOA, COCOA TOUCH, ANDROID APPLICATION FRAMEWORK, and other similar types. As used herein, determining whether the software component exists may include deciding, identifying, or finding out whether the software component is present or included in part or in whole within the software framework. Thus, for example, the method may comprise determining whether the user-inputted software component is already present or included in the software framework. In exemplary embodiments, determining whether the user-inputted software component is already present or included in the software framework may comprise, e.g., evaluating a corresponding file name against a file manifest of a software framework, evaluating a component name against a component manifest of a software framework, and/or performing a search for at least part of the software component within the instructions already present in the software framework, all based on the user- or otherwise-inputted information.

In some embodiments, step 206 may determine that the user-inputted software component exists within a software framework. In other embodiments, the step 206 may determine that the user-inputted software component does not exist within a software framework.

Method 200 may include a step 208 of creating a configuration file, the configuration file being subject to the predetermined approval condition, when, at step 206, the method 200 determines that the user-inputted software component exists within a software framework. In some embodiments, the configuration file may be generated manually by a user. In other embodiments, the configuration file may be generated by a software framework. As used herein, a configuration file may refer to a file that is used to configure one or more parameters and/or initial settings for a computer program. Some non-limiting examples may include configuration files for UNIX and UNIX-like operating systems (e.g., .cnf, .conf, .cfg, .cf, or .ini), for MS-DOS (e.g., CONFIG.SYS), for MICROSOFT WINDOWS (e.g., WIN- DOWS Registry), for MACOS (e.g., the Property list, .plist), or other similar types of files. In some embodiments, if the user-inputted software component (e.g., a module or a capability) is determined to exist within the software framework (e.g., COCOA), the method may comprise automatically creating the configuration file, wherein the configuration file is automatically generated subject to a predetermined approval condition. The configuration file, in turn, may provide instructions regarding the new module or capability provided by a software component, as well as instructions on how the new module or capability is to be utilized and/or how the new module or capability is to become a part of (or react with) the software framework. Some non-limiting examples of creating a configuration file may include using tools provided by applications to create, modify, and verify the syntax of configuration files. System administrators may also manually create and/or further modify configuration files using a text editor if customization of configuration files is desired; however, the configuration file generation engine 610 allows for the configuration file to be generated automatically without requiring intervention by a user, manager, system administrator, subject matter expert, or another entity. For example, the configuration file may be generated by the software framework subject to a predetermined approval condition (e.g., a condition that the configuration file extension or type must match the operating system), after which a system administrator further modifies the configuration file using a text editor to ensure the configuration file is further subject to a second condition.

Method 200 may include a step 210 of integrating the user-inputted software component to the software framework and creating the configuration file, wherein the configuration file is subject to the predetermined approval condition when, at step 206, the method 200 determines that the user-inputted software component does not exist within a software framework. In some embodiments, the user-generated configuration file may be added to a folder within a storage media of the software framework at the time of validation. In other embodiments, the user-generated configuration file may be added to a folder within a storage media of the software framework prior to the time of validation. It will be appreciated that the manner in which a software component is integrated into a software framework may differ based on a specific component or framework. In exemplary embodiments, a software component may be integrated into a software framework by, e.g., inserting text into a file for upload to the software framework or moving one or more text-based scripting files into a folder of the software framework.

Method 200 may include a step 212 of determining whether the user-inputted software component or the configuration file meets the predetermined approval condition. In some embodiments, the predetermined approval condition may comprise a threshold for determining if a defined validation and usage of the software framework is effective and/or accurate. For example, the method may comprise determining (e.g., providing a decision of yes it does or no it does not) whether a user-inputted software component (e.g., a module or a capability) or a configuration file (e.g., a .cnf file extension) meets a predetermined approval condition (e.g., a condition or requirement that the user-inputted software component or the configuration file matches the operating system type).

In some embodiments, the step 212 may determine that the user-inputted software component or the configuration file meets a predetermined approval condition. In other embodiments, the step 212 may determine that the user-inputted software component or the configuration file does not meet a predetermined approval condition. As an example, method 200 may determine, at step 212, that the user-inputted software component or the configuration file does not meet a predetermined approval condition and, as a result, method 200 may return to step 202 in order to receive a new or updated user-inputted software component.

Method 200 may include a step 214 of adding the respective user-inputted software component or the configuration file to the software framework when, at step 212, the method 200 determines that the user-inputted software component and/or the configuration file meets the predetermined approval condition. In some embodiments, adding a configuration file or adding a user- or otherwise-inputted software component may comprise storing the configuration file or the software component in a folder within storage media for retrieval by orchestration at runtime. As used herein, a folder may refer to a virtual location for applications, documents, data, or other subfolders. In some embodiments, as used herein, a folder may refer to a file envelope structure defined within a file system, e.g., a "folder" within the WINDOWS file system or a "directory" within a LINUX file system. As an example, the user-inputted software component or the configuration file may be stored in a data repository (e.g., GITHUB) and retrieved and added to the software framework on demand at or prior to the time of validation. As used herein, retrieve may refer to accessing stored data or files in a computer or a repository. As used herein, orchestration may refer to one or more of automated configuration, coordination, and management of a computer system, systems, or software. As used herein, configuration may refer to the arrangement of hardware and software of a computer system or network. As used herein, coordination may refer to a programming language coordinating instruction, an operating system coordinating access to hardware, a database transaction schedule coordinating access to data, or any other similar process involving coordination. As used herein, management may refer to a process of managing, monitoring, maintaining, or optimizing a computer system for performance, availability, security, and/or any base operational requirement. As used herein, runtime may refer to a time in which code is being executed on a computer's central processing unit (CPU) as machine code. In some embodiments, the configuration file may be in human readable format. As used herein, human readable format may refer to a medium or format in which an encoding of data or information can be naturally read by a human. Non-limiting examples of human readable format may include ASCII or Unicode text.

Method 200 may include a step 216 of orchestrating the software framework. As an example, orchestration may occur at any time and comprise leveraging infrastructure as code applications including tools for software provisioning, configuration management, and application deployment functionality (e.g., ANSIBLE) to retrieve stored configuration files, then add the retrieved configuration files to the software framework, and finally request a validation from the software framework.

Method 200 may include a step 218 of providing pass and fail responses for the user-inputted software component. For example, in a data-type validation action, the system may provide a fail response of the user-inputted software component not matching the type required by a data-type validation software component. For example, the system may provide a pass response of the user-inputted software component matching the type required by the data-type validation software component. As another example, the system may test for reported problems on alerting platforms, services which should or should not be running, processes that should or should not be running, log messages which should or should not be present, and the like. By implementing a plurality of tests across a plurality of technologies, the system consistently and continuously attempts to determine if the user-inputted software component is provided and implemented in a known state of one of a plurality of types.

In some embodiments, the software component or the software framework may include a validation component. In some embodiments, the software framework may be modular. In some embodiments, the software framework may be platform agnostic. Advantageously, in some embodiments, the software framework may be both modular and platform agnostic. In some embodiments, the configuration file may be stored in a folder for retrieval by orchestration at runtime. In some embodiments, the configuration file may be in human readable format.

According to another embodiment of the present disclosure, a non-transitory computer readable medium comprising instructions to perform steps for a software framework may be provided. The steps embodied in the instructions of the non-transitory computer readable medium may mirror the steps of the method 200 described herein. As such, the steps may be configured for receiving a user-inputted software component, wherein the user-inputted software component is subject to a predetermined approval condition. The steps may also be configured for receiving predetermined requirements of the user-inputted software component. The steps may be configured for determining whether the user-inputted software component exists within a software framework. The steps may be configured for, when the user-inputted software component exists within the software framework, creating a configuration file, wherein the configuration file is subject to the predetermined approval condition. Alternatively, the steps may be configured for, when the user-inputted software component does not exist, integrating the user-inputted software component to the software framework and creating the configuration file, wherein the configuration file is subject to the predetermined approval condition. The steps may be configured for determining whether the user-inputted software component or the configuration file meets the predetermined approval condition. The steps may be configured for, when the user-inputted software component or the configuration file meets the predetermined approval condition, adding the respective user-inputted software component or the configuration file to the software framework. The steps may be configured for orchestrating the software framework. The steps may be configured for providing pass and fail responses for the user-inputted software component. In some embodiments, the software component may include a validation software component. In some embodiments, the software framework may be modular. In some embodiments, the software framework may be platform agnostic. Advantageously, in some embodiments, the software framework may be both modular and platform agnostic. In some embodiments, the configuration file may be stored in a folder for retrieval by orchestration at runtime. In some embodiments, the configuration file may be in human readable format.

Orchestration and Integration

Exemplary disclosed embodiments include devices, systems, and computer readable medium for orchestration and integration of data. For example, in some embodiments, and as illustrated in FIG. 4, a system 400 may include at least one computing device 402, the at least one computing device

402 including at least one processor 406, at least one memory 404, at least one data storage 408, other hardware 410, a connected configured medium 418, and at least one communication interface (e.g., a user interface 411, a network interface 413).

Figure 7:
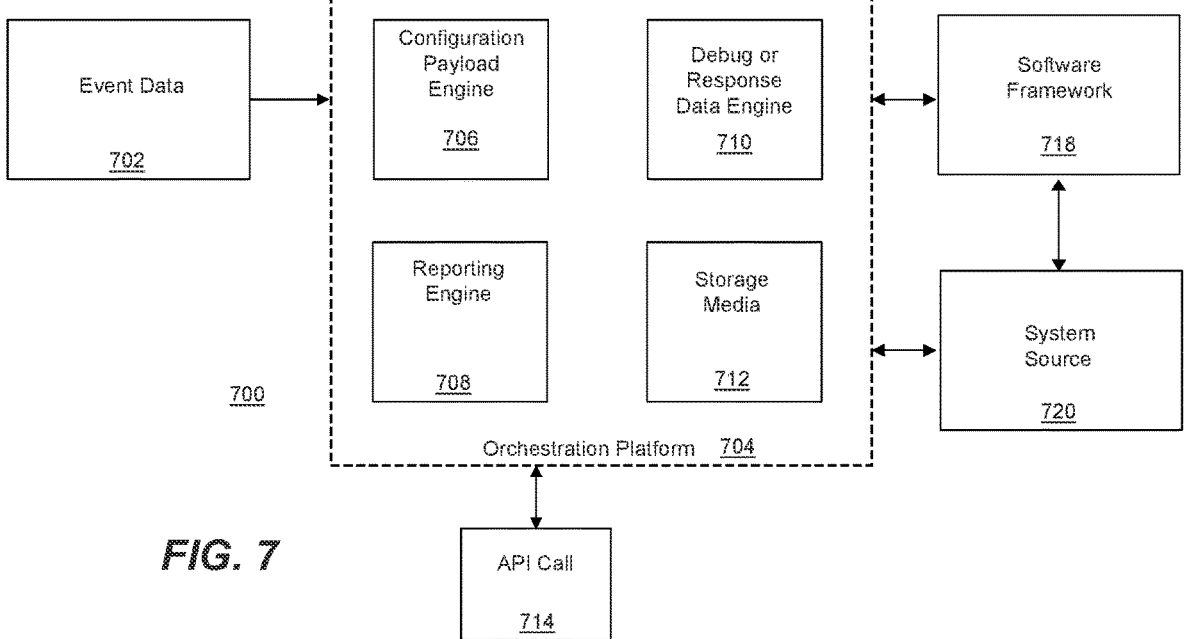
FIG. 7 illustrates an exemplary system for performing methods associated with orchestration and integration of data, consistent with some embodiments of the present disclosure.

Consistent with disclosed embodiments, and as illustrated in the example of FIG. 7, a system 700 may be configured to access a centralized orchestration platform (COP) 704, wherein the COP 704 provides a software framework 718. As used herein, access may refer to the act of reading data from or writing data to a mass storage device or other storage media 712. As used herein, a centralized orchestration platform 704 may refer to the automated configuration, coordination, and management of a computer system or systems, software, or an environment in which a piece of software is executed. For example, the environment may comprise hardware, an operating system, a web browser, any other software, or a combination of the foregoing. As used herein, a software framework 718 may refer to a software that provides generic functionality and can be modified. The software framework 718 may allow users to build and deploy applications and may provide functionality as part of a larger software platform to facilitate the development of software applications. Some non-limiting examples of a software framework 718 may include ACTIVEX, .NET, COCOA, COCOA TOUCH, ANDROID APPLICATION FRAMEWORK, and other similar types.

Consistent with disclosed embodiments, the system may be configured to send a configuration payload, generated via a configuration payload engine 706, to a software framework 718 when an event occurs (i.e., when event data 702 is received by the COP 704). As used herein, a configuration payload may refer to the probability and amount of damage which may occur as a result of an event, or alternatively to the carrying capacity of a packet or other transmission data unit pertaining to the arrangement of hardware and software of a computer system. Each payload configuration component may further be processed via a debug or response data engine 710 to provide access to debug or response data corresponding to that payload configuration component, and each debug or response data may further invoke a distinct software component which, e.g., may be integrated into the software framework 718, or which may be utilized within the COP 704. Logic on the payload configuration may determine the response by the COP 704 and the desired software component to be sent to the software framework 718 or to be implemented within the COP 704, e.g., to determine what data to log and when to log it, in response to an event, and store such data in storage media 712. As used herein, an event may refer to an action or occurrence that can be identified by a program and has significance for system hardware or software. Some non-limiting examples of an event (received as event data 702) may include installation of an OS update or upgrade, an application deployment, an application update or upgrade, a software patch, a development pipeline event, installation of an automated patch, installation of an offshore patch, another type of patch event, an incident (e.g., a piece of software infrastructure went offline, a piece of software instructions was updated, an application was updated), a network switch, an incident recovery, a manual user triggered event, an outage, a scheduled or emergency update, or any other similar event. As used herein, a patch event may generally be defined as a change or set of changes to a computer program or its supporting data designed to update, fix, or improve it, including but not limited to security patches, bug fixes, and feature updates. As used herein, a software patch may refer to a set of changes to programming code which addresses one or more specific vulnerabilities. As used herein, an automated patch may refer to a patch event that is performed and/or managed automatically or periodically. As used herein, an offshore patch may refer to patch events performed by a third-party entity. As used herein, an incident may refer to any activity which threatens the confidentiality, integrity, or availability of an information system. As used herein, a network switch may refer to a device in a computer network that connects other devices together. As used herein, an incident recovery may refer to a response to an incident based on a predetermined and adjustable set of tools and procedures. In some embodiments, the software framework may be configured to be activated or initiated as a response to a detected event.

Consistent with disclosed embodiments, a system 700 may be configured to determine, using a configuration payload provided by the COP 704, a software component of the software framework 718 to be executed. As used herein, a software component may refer to a discrete piece of code which can be independently created and maintained to be used and reused in one or different systems. As used herein, execute may refer to a process by which a computer or virtual machine reads and acts on the instructions of a computer program. In an exemplary embodiment, a configuration payload that determines a software component to be executed in response to an event may include a preconfigured configuration file which is added to the software framework 718, thereby causing the software framework to perform validation.

Consistent with disclosed embodiments, the system 700 may be configured to execute the determined software component and track an execution status of the software component. As used herein, the determined software component may refer to a part of a software framework 718 that includes software components chosen or determined to be executed. For example, in response to an event, it may be determined, via either the COP 704 or the system 700, or both, that one or more particular software components are to be executed. As used herein, execution status may refer to a state or condition of the execution. Some non-limiting examples of the execution status may range from 0% to 100%, e.g., 0%, 5%, 6%, 15%, 25%, 50%, 75%, or 100%. In some embodiments, a determined software component may be executed remotely or, alternatively, the execution of the determined software component may be performed by connecting and deploying the software framework 718 locally on a remote system.

Consistent with disclosed embodiments, the system 700 may be configured to report the tracked execution status of the software component as a result. As used herein, report may refer to describing the execution status as being in a specified state. In various embodiments, a report may be generated by reporting engine 708 and displayed on a screen, printed on a paper, displayed on any user interface device or output, presented to a user via a website or via a graphic user interface, or transmitted to another computer or processor. As used herein, result may refer to obtained information after execution. In some embodiments, the result is reported through an application programming interface (API) call 714 to the COP 704. As used herein, an API may refer to a defined interface or a connection between computers or between computer programs. Another non-limiting example of a result may include an email report (e.g., a sent email containing results of an execution).

Consistent with disclosed embodiments, the system 700 may be configured to alert a system source 720 of the result.

As used herein, a system source 720 may refer to any system, device, or file that captures or holds data of interest.

In some embodiments, the software component may include a validation software component. As used herein, validation may refer to a process of ensuring that data is sensible and feasible. Some non-limiting examples of validation may include data type validation, range and constraint validation, code and cross-reference validation, format validation, structured validation, consistency validation, requirements validation, usability validation, uniqueness validation, or any other process of ensuring that data is sensible and feasible.

As such, the disclosed exemplary orchestration platform 704 provides an improved framework which doesn't require intervention for orchestration and integration of software components in response to a detected event. No intervention is required by, e.g., a user, a manager, a subject matter expert, or another entity associated with a software framework 718 or system 700. Instead, the orchestration platform 704 is configured to provide a configuration payload (via configuration payload engine 706) which in turn determines debug or response data (generated via debug or response data engine) which is comprised of one or more software components to be executed in either a software framework 718 or the orchestration platform 704 itself. An improved framework is thereby provided which automates consistent execution of debug- and/or response-related software components based on a continuous feed of event data. The improved framework thus orchestrates system responses, which may further include reporting on execution statuses, based on the initial detection of particular events to or within a software framework and based on one or more software components which are determined to be executed in response to each such particular event.

According to another embodiment of the present disclosure, a method for orchestration and integration of data may be provided. FIG. 3 illustrates an exemplary method for orchestration and integration of data.

As illustrated in FIG. 3, method 300 may include a step 302 of accessing a centralized orchestration platform (COP), wherein the COP provides a software framework. As used herein, accessing may refer to the act of reading data from or writing data to a mass storage device. As used herein, a centralized orchestration platform may refer to the automated configuration, coordination, and management of a computer system or systems, software, or an environment in which a piece of software is executed. For example, the environment may comprise hardware, an operating system, a web browser, any other software, or a combination of the foregoing. As used herein, a software framework may refer to a software that provides generic functionality and can be modified. The framework may allow users to build and deploy applications and may provide functionality as part of a larger software platform to facilitate the development of software applications. Some non-limiting examples of a software framework may include ACTIVEX, .NET, COCOA, COCOA TOUCH, ANDROID APPLICATION FRAMEWORK, and other similar types.

Method 300 may also include a step 304 of determining whether an event has occurred. For example, at step 304, method 300 may determine that an event has occurred based on a received event data. In another example, at step 304, method 300 may determine that an event has not occurred based on another received event data or based on no received event data. In the latter example, method 300 may return to step 302 until method 300 determines that an event has occurred based on received event data. Method 300 may also include a step 306 of generating and sending a configuration payload to the software framework when, at step 304, method 300 determines that an event has occurred. As used herein, a configuration payload may be generated by a configuration payload engine of the COP, and may refer to the probability and amount of damage which may occur as a result of the event, or alternatively to the carrying capacity of a packet or other transmission data unit pertaining to the arrangement of hardware and software of a computer system. Each payload configuration component may further be processed by a debug or response data engine to provide access to corresponding debug or response data, each debug or response data invoking a distinct software component for execution within either the COP or the software framework. Logic on the payload may determine the response and the desired software component, e.g., to determine what data to log and when to log it, in response to an event, and storing such data in storage media. As used herein, an event (as determined based on event data received by the COP) may refer to an action or occurrence that can be identified by a program and has significance for system hardware or software. Some non-limiting examples of an event may include installation of an OS update or upgrade, an application deployment, an application update or upgrade, a development pipeline event, a software patch, installation of an automated patch, installation of an offshore patch, another type of patch event, an incident (e.g., a piece of software infrastructure went offline, a piece of software instructions was updated, an application was updated), a network switch, an incident recovery, a manual user triggered event, or any other similar event. As used herein, a patch event may generally be defined as a change or set of changes to a computer program or its supporting data designed to update, fix, or improve it, including but not limited to security patches, bug fixes, and feature updates. As used herein, a software patch may refer to a set of changes to programming code which addresses one or more specific vulnerabilities. As used herein, an automated patch may refer to a patch event that is performed and/or managed automatically or periodically. As used herein, an offshore patch may refer to patch events performed by a third-party entity. As used herein, an incident may refer to any activity which threatens the confidentiality, integrity, or availability of an information system. As used herein, a network switch may refer to a device in a computer network that connects other devices together. As used herein, an incident recovery may refer to a response to an incident based on a predetermined and adjustable set of tools and procedures. In some embodiments, the method may comprise configuring the software framework to be activated or initiated as a response to a detected event. An event may be detected, and the software framework may be activated, using, e.g., a digital workflow management software (e.g., ServiceNow).

Further, method 300 may include a step 308 of determining, using the configuration payload, a software component of the software framework to be executed. As used herein, a software component may refer to a discrete piece of code which can be independently created and maintained to be used and reused in one or different systems. As used herein, execute may refer to a process by which a computer or virtual machine reads and acts on the instructions of a computer program. In an exemplary embodiment, a configuration payload that determines a software component to be executed in response to an event may include a preconfigured configuration file which is added to the software framework, thereby causing the software framework to perform steps comprising a process of validation.

Method 300 may include a step 310 of executing the determined software component and tracking an execution status. As used herein, the determined software component may refer to a part of a software framework that includes software components chosen or determined to be executed. For example, in response to an event, the method may comprise determining that one or more particular software components are to be executed. As used herein, execution status may refer to a state or condition of the execution. Some non-limiting examples of the execution status may range from 0% to 100%, e.g., 0%, 5%, 6%, 15%, 25%, 50%, 75%, or 100%. In some embodiments, the method may comprise executing a determined software component or alternatively executing the determined software component by connecting and deploying the software framework locally on a remote system.

Method 300 may include a step 312 of reporting the tracked execution status as a result. As used herein, reporting may refer to describing the execution status as being in a specified state. In various embodiments, reporting may comprise displaying on a screen, printing on a paper, displaying on any user interface device or output, presenting to a user via a website or via a graphic user interface, or transmitting to another computer or processor. As used herein, a result may refer to obtained information after execution. In some embodiments, the result is reported through an application programming interface (API) call to the COP. As used herein, an API may refer to a defined interface or a connection between computers or between computer programs. Another non-limiting example of a report may include an email report (e.g., a sent email containing results of an execution).

Method 300 may include a step 314 of alerting a system source of the result. As used herein, a system source may refer to any system or file that captures or holds data of interest.

In some embodiments, the software component or a software framework may include a validation software component. As used herein, a validation software component may refer to a process of validation to ensure that data is sensible and feasible. Some non-limiting examples of validation may include data type validation, range and constraint validation, code and cross-reference validation, format validation, structured validation, consistency validation, requirements validation, usability validation, uniqueness validation, or any other process of ensuring that data is sensible and feasible.

In some embodiments, executing the determined software component may be performed remotely or performed by connecting and deploying the software framework locally on a remote system. In some embodiments, the result may be reported through an application programming interface (API) call to the COP.

According to another embodiment of the present disclosure, a non-transitory computer readable medium comprising instructions to perform steps for orchestration and integration of data may be provided. The steps embodied in the instructions of the non-transitory computer readable medium may mirror the steps of the method 300 described herein. As such, the steps may be configured for accessing a centralized orchestration platform (COP), wherein the COP provides a software framework. The steps may also be configured for, when an event occurs, sending a configuration payload to the software framework. The steps may be configured for determining, using the configuration payload, a software component of the software framework to be executed. The steps may be configured for executing the determined software component and tracking an execution status. The steps may also be configured for reporting the tracked execution status as a result. The steps may also be configured for alerting a system source of the result. In some embodiments, the software component may include a validation software component. In some embodiments, executing the determined software component may be remotely performed by connecting and deploying the software framework locally on a remote system. In some embodiments, the result may be reported through an application programming interface (API) call to the COP.

It will be apparent to those skilled in the art that various modifications and variations can be made for the integration of a software component into a software framework, the software framework, or the orchestration and integration of data, as executed by at least one processor. While illustrative embodiments have been described herein, the scope of the present disclosure includes any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the present disclosure. It is intended, therefore, that the specification and examples be considered as exemplary only, with a true scope and spirit of the present disclosure being indicated by the following claims and their full scope of equivalents.

What is claimed is:

1. A method for orchestration and integration of data, the method comprising:
   receiving a continuous feed of event data;
   validate the received event data, using structured validation, consistency validation, requirements validation, usability validation, or uniqueness validation;
   after the event data is validated, analyzing the event data to determine an occurrence of an event, wherein the event includes at least one of: a deployment, an update, or an incident recovery;
   when an event occurs, generating a configuration payload and providing the configuration payload to an orchestration platform, wherein the configuration payload comprises logic for determining a response and a probability and amount of damage that occurs as a result of the event;
   determining a software component of the orchestration platform to be executed within a software framework based on the configuration payload;
   when the software framework includes the software component, creating a configuration file for the software component;
   when the software framework does not include the software component, integrating the software component into the software framework and then creating the configuration file; and
   executing the software component within the software framework.

2. The method of claim 1, wherein the software component includes a validation software component.

3. The method of claim 1, wherein the software component is executed remotely by connecting and deploying the software framework locally on a remote system.

4. The method of claim 1, further comprising providing passing and failing responses based on the execution of the software component.

5. The method of claim 1, further comprising:

tracking an execution status of the software component;

providing the tracked execution status as a result; and alerting a system source of the result.

6. The method of claim 5, wherein the result is provided through an application programming interface (API) call to the orchestration platform.

7. A system for data orchestration and integration, the system comprising:

at least one processor configured to:

receive a continuous feed of event data;

validate the received event data, using structured validation, consistency validation, requirements validation, usability validation, or uniqueness validation;

after the event data is validated, analyze the event data to determine an occurrence of an event, wherein the event includes at least one of: a deployment, an update, or an incident recovery;

when an event occurs, generate a configuration payload and provide the configuration payload to an orchestration platform, wherein the configuration payload comprises logic for determining a response and a probability and amount of damage that occurs as a result of the event;

determine, via the orchestration platform, a software component to be executed within a software framework based on the configuration payload;

when the software framework includes the software component, create a configuration file for the software component;

when the software framework does not include the software component, integrate the software component into the software framework and then create the configuration file; and execute the software component within the software framework.

8. The system of claim 7, wherein the software component includes a validation software component.

9. The system of claim 7, wherein the determined software component is executed remotely by connecting and deploying the software framework locally on a remote system.

10. The system of claim 7, wherein the at least one processor is further configured to provide passing and failing responses based on the execution of the software component.

11. The system of claim 7, wherein the at least one processor is further configured to:

track an execution status of the software component;

provide the tracked execution status as a result; and alert a system source of the result.

12. The system of claim 11, wherein the result is provided through an application programming interface (API) call to the orchestration platform.

13. A non-transitory computer readable medium containing instructions that when executed by at least one processor, cause the at least one processor to perform data orchestration and integration operations comprising:

receiving a continuous feed of event data;

validate the received event data, using structured validation, consistency validation, requirements validation, usability validation, or uniqueness validation;

after the event data is validated, analyzing the event data to determine an occurrence of an event, wherein the event includes at least one of:

a deployment, an update, or an incident recovery;

when an event occurs, generating a configuration payload and providing the configuration payload to an orchestration platform, wherein the configuration payload comprises logic for determining a response and a probability and amount of damage that occurs as a result of the event;

determining a software component of the orchestration platform to be executed within a software framework based on the configuration payload;

when the software framework includes the software component, creating a configuration file for the software component;

when the software framework does not include the software component, integrating the software component into the software framework and then creating the configuration file; and executing the software component within the software framework.

14. The non-transitory computer readable medium of claim 13, wherein the software component includes a validation software component.

15. The non-transitory computer readable medium of claim 13, wherein the software component is executed remotely by connecting and deploying the software framework locally on a remote system.

16. The non-transitory computer readable medium of claim 13, the operations further comprising providing passing and failing responses based on the execution of the software component.

17. The non-transitory computer readable medium of claim 13, the operations further comprising:

tracking an execution status of the software component;

providing the tracked execution status as a result; and alerting a system source of the result.

18. The non-transitory computer readable medium of claim 17, wherein the result is provided through an application programming interface (API) call to the orchestration platform.

19. The non-transitory computer readable medium of claim 13, the operations further comprising evaluating the software component subject to a predetermined condition.

20. The non-transitory computer readable medium of claim 13, wherein the configuration file is created subject to a predetermined condition.

\* \* \* \* \*